United States Patent
Pung et al.

(10) Patent No.: US 10,845,199 B2
(45) Date of Patent: Nov. 24, 2020

(54) IN-VENUE TRANSIT NAVIGATION

(71) Applicant: Apple Inc., Cupertino, CA (US)

(72) Inventors: Brandon J. Pung, Boston, MA (US); Michael H. Schrag, Ruther Glen, VA (US); Ellis M. Verosub, San Carlos, CA (US); Usama M. Hajj, San Francisco, CA (US); Mikey M. Fujihara, Oakland, CA (US); Jan F. Sanchez Dudus, Cupertino, CA (US); Ian D. Leighton, Kensington, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 15/275,327

(22) Filed: Sep. 23, 2016

(65) Prior Publication Data
US 2017/0356742 A1    Dec. 14, 2017

Related U.S. Application Data

(60) Provisional application No. 62/348,830, filed on Jun. 10, 2016.

(51) Int. Cl.
*G01C 21/20* (2006.01)
(52) U.S. Cl.
CPC .................. *G01C 21/206* (2013.01)
(58) Field of Classification Search
None
See application file for complete search history.

(56) References Cited

U.S. PATENT DOCUMENTS

| | | | |
|---|---|---|---|
| 5,974,357 A * | 10/1999 | Poonsaengsathit | ........................ G01C 21/3626 701/428 |
| 6,018,697 A * | 1/2000 | Morimoto | .............. G01C 21/34 340/988 |

(Continued)

FOREIGN PATENT DOCUMENTS

CN         104296743 A  *  1/2015

OTHER PUBLICATIONS

Machine translation of CN104296743A (Year: 2015).*

*Primary Examiner* — Navid Ziaeianmehdizadeh
(74) *Attorney, Agent, or Firm* — Invoke

(57) ABSTRACT

Some embodiments of the invention provide a navigation application that generates navigation instructions for a route, including navigation instruction for navigating within a venue. One example of such a venue is transit station. The navigation application identifies a portion of the route that includes two locations within a station, such as an access point (e.g., an entrance or exit) of the transit station and a platform within the station at which a transit vehicle arrives. The application identifies a path between the two locations (e.g., between an access point and a platform, between two platforms within the station, between a platform and another location within the station, or between any arbitrary two locations within the station). The application provides several turn-by-turn navigation instructions for navigating the path based on actual instructions signs that are displayed within the station to provide guidance for traveling between different locations in the station. For some embodiments, surveyors manually curate the instruction signs by traversing through the station and recording the instruction signs. Alternatively, or conjunctively, some embodiments identify (Continued)

the station signs by obtaining information about them from one or more servers of station operators or third parties.

22 Claims, 12 Drawing Sheets

(56) References Cited

U.S. PATENT DOCUMENTS

| | | | |
|---|---|---|---|
| 6,119,065 A | 9/2000 | Shimada et al. | |
| 6,128,571 A * | 10/2000 | Ito | G01C 21/3679 340/995.24 |
| 6,510,379 B1 * | 1/2003 | Hasegawa | G01C 21/20 340/988 |
| 6,671,615 B1 * | 12/2003 | Becker | G01C 21/3697 340/988 |
| 6,728,636 B2 | 4/2004 | Kokojima et al. | |
| 6,922,630 B2 * | 7/2005 | Maruyama | G01C 21/26 342/357.31 |
| 7,266,447 B2 | 9/2007 | Bauer et al. | |
| 7,941,269 B2 * | 5/2011 | Laumeyer | G01C 21/30 701/523 |
| 8,019,537 B2 * | 9/2011 | DeVries | G01C 21/3626 701/25 |
| 8,612,151 B2 * | 12/2013 | Winkler | G01C 21/3647 340/995.2 |
| 8,688,377 B1 * | 4/2014 | Urbach | G01C 21/32 701/400 |
| 8,930,141 B2 * | 1/2015 | Wither | G01C 21/3635 340/995.1 |
| 9,436,879 B2 * | 9/2016 | Zobel | G06K 9/00818 |
| 9,582,814 B2 * | 2/2017 | Grace | G01C 21/3476 |
| 9,697,430 B2 * | 7/2017 | Kristensen | G06K 9/00818 |
| D800,143 S * | 10/2017 | Inose | D14/485 |
| 2002/0075323 A1 * | 6/2002 | O'Dell | G01C 21/3647 715/835 |
| 2002/0077749 A1 * | 6/2002 | Doi | G01C 21/20 701/433 |
| 2003/0158650 A1 * | 8/2003 | Abe | G01C 21/20 701/420 |
| 2004/0070602 A1 * | 4/2004 | Kobuya | G01C 21/36 715/738 |
| 2006/0004512 A1 * | 1/2006 | Herbst | G01C 21/3638 701/431 |
| 2006/0004513 A1 * | 1/2006 | Bauer | G01C 21/20 701/423 |
| 2008/0312827 A1 * | 12/2008 | Kahlow | G01C 21/3626 701/533 |
| 2009/0187335 A1 * | 7/2009 | Muhlfelder | G01C 21/3635 701/532 |
| 2010/0121567 A1 * | 5/2010 | Mendelson | G01C 21/206 701/467 |
| 2010/0125409 A1 * | 5/2010 | Prehofer | G01C 21/206 701/408 |
| 2010/0302361 A1 * | 12/2010 | Yoneyama | G06K 9/00818 348/135 |
| 2011/0109618 A1 * | 5/2011 | Nowak | G01C 21/3647 345/419 |
| 2011/0112756 A1 * | 5/2011 | Winkler | G01C 21/3647 701/533 |
| 2011/0178701 A1 * | 7/2011 | Gupta | G01C 21/20 701/465 |
| 2011/0178705 A1 * | 7/2011 | Pakzad | G01C 21/20 701/533 |
| 2011/0184640 A1 * | 7/2011 | Coleman | G01C 21/3492 701/533 |
| 2011/0276266 A1 * | 11/2011 | Ballew | G01C 21/206 701/533 |
| 2012/0072106 A1 * | 3/2012 | Han | G01S 5/0252 701/410 |
| 2013/0101163 A1 * | 4/2013 | Gupta | G06K 9/00671 382/103 |
| 2013/0345959 A1 * | 12/2013 | van Os | G08G 1/0969 701/408 |
| 2014/0032110 A1 * | 1/2014 | Simring | G01C 21/34 701/533 |
| 2014/0244165 A1 * | 8/2014 | Bells | G01C 21/367 701/455 |
| 2014/0347492 A1 * | 11/2014 | Fales | G01C 11/06 348/164 |
| 2014/0365122 A1 * | 12/2014 | McGavran | G01C 21/3632 701/533 |
| 2015/0116356 A1 * | 4/2015 | Alon | G01C 21/206 345/633 |
| 2015/0153180 A1 * | 6/2015 | Ettinger | G01C 21/206 701/410 |
| 2016/0012496 A1 * | 1/2016 | Hanson | H04W 4/02 705/323 |
| 2016/0350286 A1 * | 12/2016 | Murthy | G01C 21/3602 |
| 2016/0356622 A1 * | 12/2016 | McGavran | G01C 21/3667 |
| 2017/0177957 A1 * | 6/2017 | Yokochi | H04N 5/77 |

* cited by examiner

IN-VENUE TRANSIT NAVIGATION

BACKGROUND

With proliferation of mobile devices such as smartphones, users are enjoying numerous applications of numerous kinds that can be run on their devices. One popular type of such application is mapping and navigation applications that allow user to browse maps and get route directions. Despite their popularity, these mapping and navigation applications have yet to introduce a comprehensive and efficient transit routing and navigation system to the market.

BRIEF SUMMARY

Some embodiments of the invention provide a navigation application that generates navigation instructions for a route, including navigation instruction for navigating within a venue. One example of such a venue is transit station. The navigation application identifies a portion of the route that includes two locations within a station, such as an access point (e.g., an entrance or exit) of the transit station and a platform within the station at which a transit vehicle arrives. The application identifies a path between the two locations (e.g., between an access point and a platform, between two platforms within the station, between a platform and another location within the station, or between any arbitrary two locations within the station).

The application provides several turn-by-turn navigation instructions for navigating the path based on actual instructions signs that are displayed within the station to provide guidance for traveling between different locations in the station. For some embodiments, surveyors manually curate the instruction signs by traversing through the station and recording the instruction signs. Alternatively, or conjunctively, some embodiments identify the station signs by obtaining information about them from one or more servers of station operators or third parties.

When the access point is the station entrance and the other location is a platform, the path is from an entrance of the station to the platform at which the transit vehicle departs the station, and the navigation instructions provide turn-by-turn guidance from the entrance to the platform. On the other hand, when the access point is an exit from the station and the other location is a platform, the path is from the platform, at which the transit vehicle stops to unload passengers, to the exit, and the navigation instructions provide turn-by-turn guidance from the platform to the exit. Such in-station navigation instructions are highly useful in large stations in which the path between the station access points and the station platforms is not easily discernable.

In some embodiments, the navigation instructions within the station are defined by reference to instructions provided on the signs displayed with the station. For instance, the navigation instructions in some embodiments refer to the signs displayed in the station. In some embodiments, each navigation instruction includes a set of words that are derived from or are identical to a set of words used in the sign associated with the navigation instruction. Also, in some embodiments, each navigation instruction includes a set of text instructions. For at least one navigation instruction, the text instruction set is based on a first portion of a particular sign's text instructions that is relevant to a direction of the path but is not based on a second portion of the particular sign's text instructions that is not relevant to the direction of the path.

In some embodiments, the navigation application executes on a mobile device, which has a language setting. When a particular sign in the station includes first and second sets of text instructions in first and second languages, the navigation application uses the language setting of the mobile device to select the text instruction set in one of the two languages to generate the in-station navigation instructions in that language. Also, the station signs typically have graphical objects, like directional arrows or icons associated with locations in the station. In some embodiments, the navigation instructions that are associated with such station signs can have representations of the graphical objects. The navigation application in some embodiments provides all the in-station navigation instructions in one navigation banner, while in other embodiments, it uses different navigation banners for each in-station instruction or a group of in-station instructions.

To generate the navigation instructions, the navigation application of some embodiments identifies a node connection graph for the station in some embodiments. This graph in some embodiments includes (1) several nodes that represent a plurality of locations within the station, and (2) several edges that connect the nodes and that represent the connecting area (e.g., walkways, staircases, etc.) between the locations associated with the nodes. In some embodiments, each edge in the connection graph is either unidirectional or bi-directional, and can have a time associated with each of its directions, where the time represents the time needed to travel the connecting area that links the two locations associated with the edge's two nodes. The navigation application uses the edge times in some embodiments to compute the time needed to travel along a path in a transit station, and in turn, uses this time to identify other aspects of the navigated route (such as the best access point to use, the time for reaching the platform, etc.).

After identifying the node connection graph, the navigation application identifies a path on the node graph between the access point and the platform. This path uses a subset of nodes in the node graph, and has a direction. When the access point is a station entrance and the other location is a platform, the path is from the entrance to the platform at which a transit vehicle departs. When the access point is a station exit and the other location is a platform, the path is from the platform at which a transit vehicle arrives to the exit.

After identifying the path, the navigation application defines several navigation instructions by reference to several station signs. Each of these signs associates a pair of station locations that are represented by a pair of nodes in the identified set of nodes in the direction of the path. The navigation instructions in some embodiments provide instructions for traveling between two locations in the station.

In some embodiments, some navigation instructions can provide instructions for traveling between two adjacent locations that are represented by two neighboring (i.e., consecutive) nodes in the node graph, while other navigation instructions can provide instructions for traveling between two non-adjacent locations that are represented by two non-neighboring nodes in the node graph. Navigation instructions can guide travel between two non-neighboring locations because the station signs at one station location might provide guidance to traverse to a non-neighboring station location. In this situation, the navigation instructions mimic the station signs in order to avoid confusion and to provide fewer navigation instructions (i.e., by eliminating unnecessary navigation instructions to intervening neighboring station locations).

One of ordinary skill will realize that the above-described techniques for providing navigation instructions within a transit station can easily be extended to providing navigation instructions within any large venue, such as a stadium, a mall, or other large private venue. Also, while some of the above-described examples provide guidance for a path between an access point of the station and a platform, these techniques can be used to provide guidance between any two locations within a station.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

Figure 1:
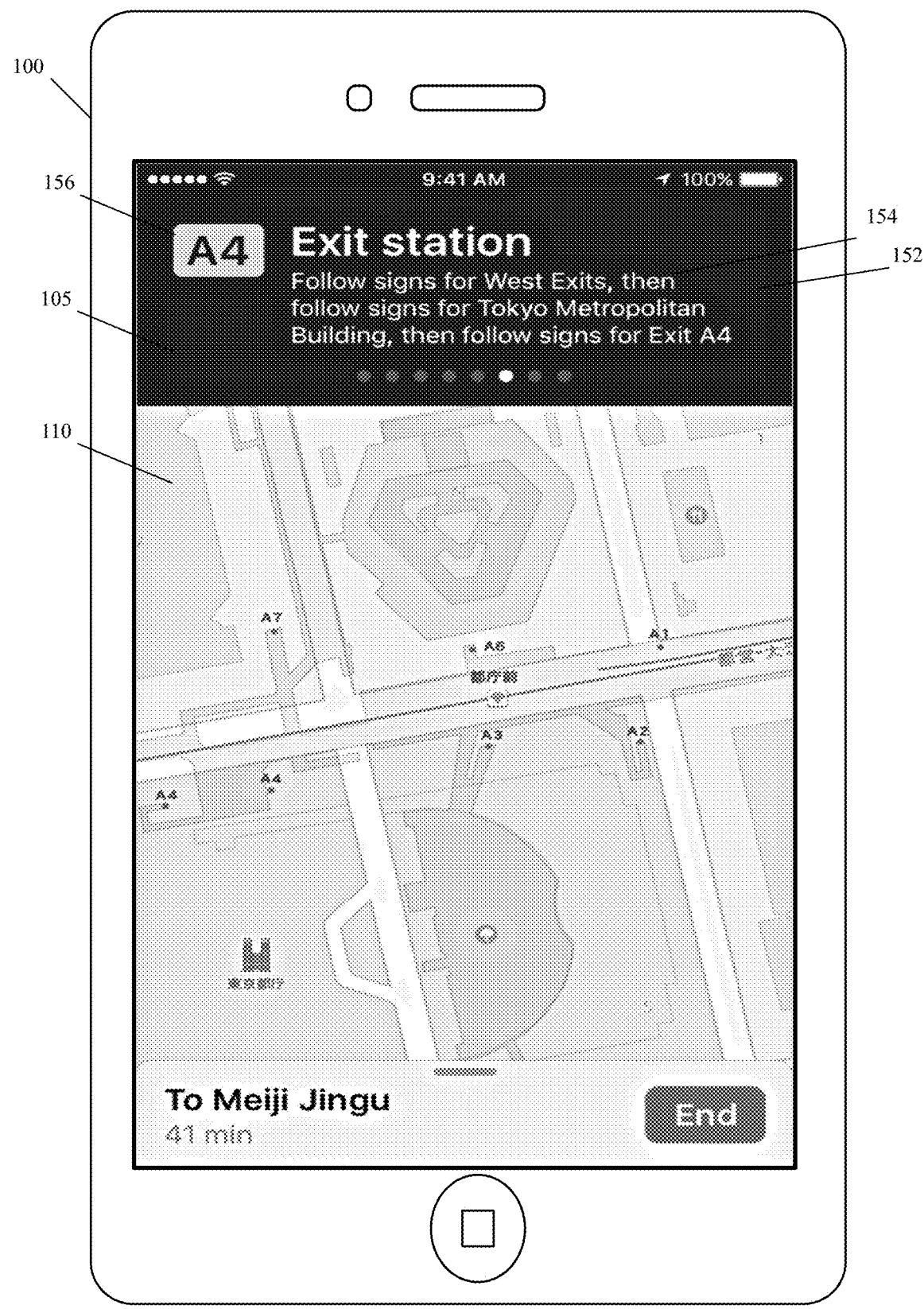
FIG. 1 illustrates a navigation banner that the navigation application of some embodiments presents during a navigation presentation.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a navigation application that generates navigation instructions for a route, including navigation instruction for navigating within a venue. One example of such a venue is transit station. The navigation application identifies a portion of the route that includes two locations within a station, such as an access point (e.g., an entrance or exit) of the transit station and a platform within the station at which a transit vehicle arrives. The application identifies a path between the two locations (e.g., between an access point and a platform, between two platforms within the station, between a platform and another location within the station, or between any arbitrary two locations within the station).

The application provides several turn-by-turn navigation instructions for navigating the path based on actual instructions signs that are displayed within the station to provide guidance for traveling between different locations in the station. For some embodiments, surveyors manually curate the instruction signs by traversing through the station and recording the instruction signs. Alternatively, or conjunctively, some embodiments identify the station signs by obtaining information about them from one or more servers of station operators or third parties.

When the access point is the station entrance and the other location is a platform, the path is from an entrance of the station to the platform at which the transit vehicle departs the station, and the navigation instructions provide turn-by-turn guidance from the entrance to the platform. On the other hand, when the access point is an exit from the station and the other location is a platform, the path is from the platform, at which the transit vehicle stops to unload passengers, to the exit, and the navigation instructions provide turn-by-turn guidance from the platform to the exit. Such in-station navigation instructions are highly useful in large stations in which the path between the station access points and the station platforms is not easily discernable.

In some embodiments, the navigation instructions within the station are defined by reference to instructions provided on the signs displayed with the station. For instance, the navigation instructions in some embodiments refer to the signs displayed in the station. In some embodiments, each navigation instruction includes a set of words that are derived from or are identical to a set of words used in the sign associated with the navigation instruction. Also, in some embodiments, each navigation instruction includes a set of text instructions. For at least one navigation instruction, the text instruction set is based on a first portion of a particular sign's text instructions that is relevant to a direction of the path but is not based on a second portion of the particular sign's text instructions that is not relevant to the direction of the path.

In some embodiments, the navigation application executes on a mobile device, which has a language setting. When a particular sign in the station includes first and second sets of text instructions in first and second languages, the navigation application uses the language setting of the mobile device to select the text instruction set in one of the two languages to generate the in-station navigation instructions in that language. Also, the station signs typically have graphical objects, like directional arrows or icons associated with locations in the station. In some embodiments, the navigation instructions that are associated with such station signs can have representations of the graphical objects.

Figure 2:
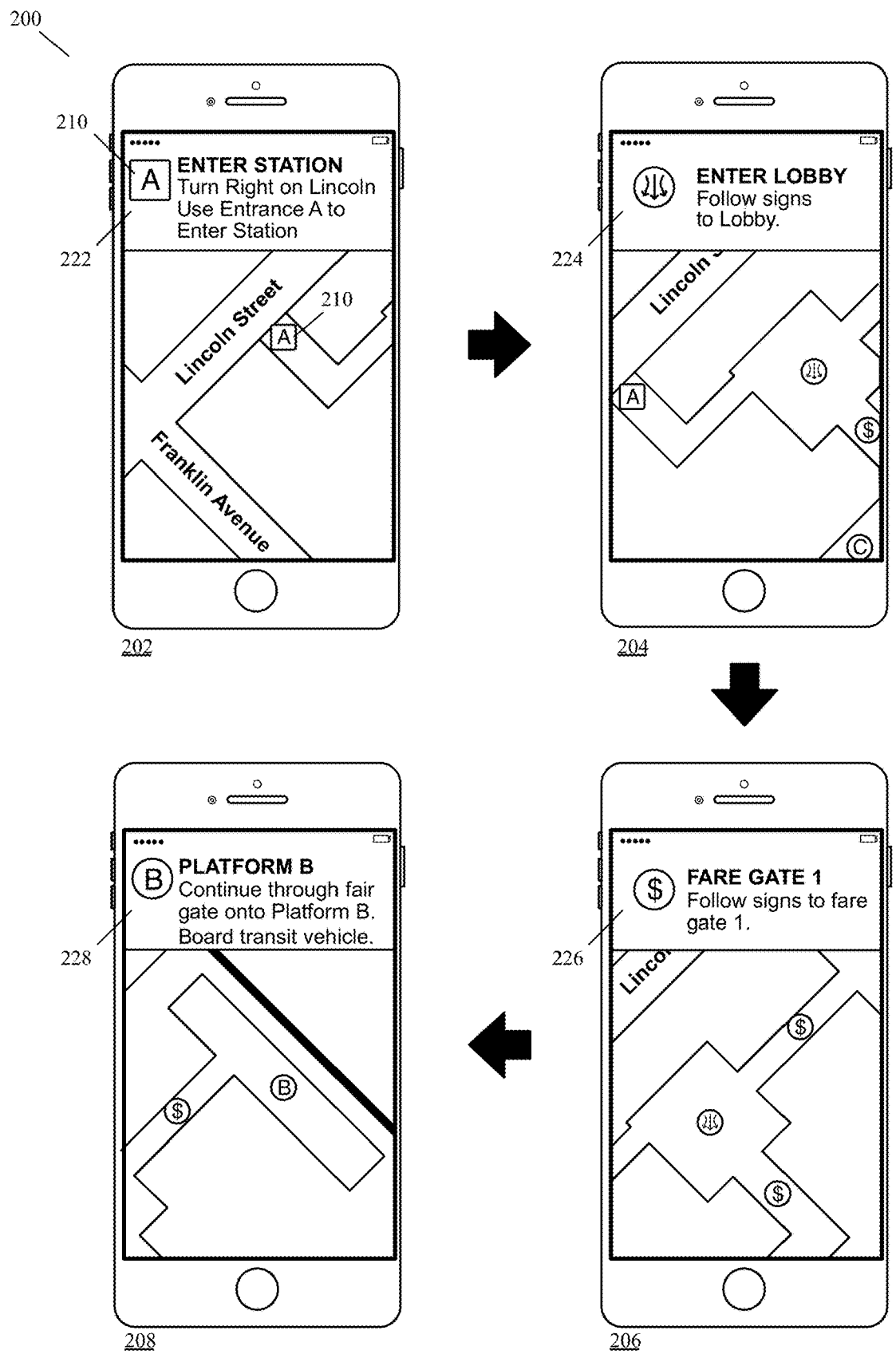
FIG. 2 illustrates a portion of a navigation presentation that guides a user through an entrance of a transit station to a platform of a transit vehicle that travels a transit leg of a navigated route.

The navigation application in some embodiments provides all the in-station navigation instructions in one navigation banner, while in other embodiments, it uses different navigation banners for each in-station instruction or a group of in-station instructions. These differing approaches are illustrated in FIGS. 1 and 2. FIG. 1 illustrates a navigation banner 105 that the navigation application of some embodiments presents during a navigation presentation 110. The application in this example executes on a mobile device 100 (e.g., a smartphone, tablet, wearables) to provide the navigation presentation 110 that generates and displays turn-by-turn navigation instructions to guide the user as the device traverses a route that includes travel along at least one transit line (e.g., subway line, train line, bus line, etc.) with at least one transit vehicle (such as a train, a bus, etc.).

In the example illustrated in FIG. 1, the transit vehicle is a train that has arrived at Meiji Jingu station in Tokyo. This station is a large station with many exits. Navigating from the train's platform to the best exit in the station is not a straightforward task. Hence, the navigation application displays the navigation banner 105 to provide multiple navigation instructions for navigating from the arriving train's platform to the desired station exit. As shown, the banner has a header 152 that includes (1) a header description 154 that explains that the overall navigation maneuver is to exit the station, and (2) a sign component 156 that provides a sign A4 to identify the A4 exit to use. This sign corresponds in some embodiments to the exit identifier shown within the station.

In addition to these high level indicators, the banner also provides three navigation maneuver instructions with respect to three signs within the station. These three navigation maneuver instructions state: "Follow signs for West Exits, then follow signs for Tokyo Metropolitan Building, and then follow signs for Exit A4." Each of these maneuver instructions refers to one or more actual signs in the Meiji Jingu station. Also, in some embodiments, the text that is used to describe each of these maneuver instructions is identical to, or derived from, some or all of the text that is displayed on the actual signs in the Meiji Jingu station.

This station may include instructions in both English and Japanese. In some embodiments, the mobile device 100 has a language setting, which, in this example, is set to English. Hence, the navigation instructions in the banner 105 are provided in some embodiments by referring to the station signs in English and by using the English text in these signs. When the language setting for this mobile device is set to Japanese, the navigation instructions in some embodiments will be in Japanese in the banner 105 and will use the Japanese text in the signs referenced in the banner 105.

FIG. 2 illustrates a portion of a navigation presentation that guides a user through an entrance of a transit station to a platform of a transit vehicle that travels a transit leg of a navigated route. In this example, the navigation presentation provides a different maneuver banner 222-228 for the different maneuvers that the user has to perform to get into the station and to reach the station platform. This example is illustrated in four stages 202-208 that illustrate four operational states of the navigation presentation.

The first stage 202 illustrates a maneuver banner 222 that provides instructions from a particular location to a station entrance A, which is one of several entrances of the station. When there are multiple station access points and/or multiple paths between the station access points and a particular platform, the navigation application of some embodiments explores multiple paths to the platform and selects the best one in terms of one or more metrics, such as shortest distance, shortest travel time, etc. In exploring these different paths, the navigation application can explore these different internal paths (in-station paths) in combination with two or more external paths outside of the station in order to identify the best overall route (inside and outside of the station) in terms of the used metrics. This exploration will be further described below by reference to FIG. 9.

The second stage 204 illustrates a maneuver banner 224 that provides instructions from the station entrance A to a central concourse (lobby) in the station. The third stage 206 illustrates a maneuver banner 226 that provides instructions from the central concourse (lobby) to a fare gate in the station. The fourth stage 208 illustrates a maneuver banner 228 that provides instructions from the fare gate to the desired transit vehicle's platform B. The text instruction in banners 224-228 refer to signs in the station, and are derived from the text instructions of these signs.

In some embodiments, the navigation application provides different maneuver banners for different maneuvers in each station, while in other embodiments, the navigation application provides one maneuver banner for all maneuvers in each station. In still other embodiments, the navigation application provides different maneuver banners for different maneuvers in some stations, while using just one maneuver banner for all maneuvers in other stations. In yet other embodiments, the navigation application provides different maneuver banners for different maneuvers in one station, while using one maneuver banner for several maneuvers in the same station.

Figure 3:
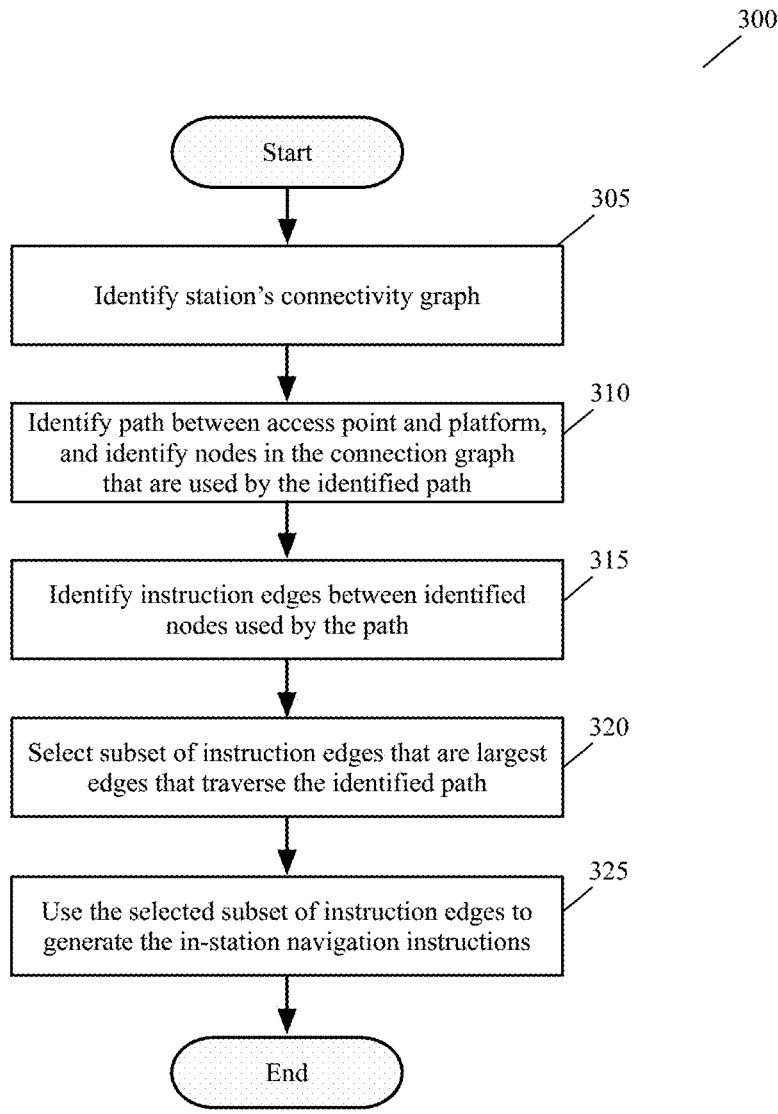
FIG. 3 illustrates a process that the navigation application uses in some embodiments to generate in-station navigation instructions based on the signs in the station.

FIG. 3 illustrates a process 300 that the navigation application uses in some embodiments to generate in-station navigation instructions based on the signs in the station. The navigation application performs this process after it selects an access point and a platform that need to be traversed by a portion of the navigated route for which the application is generating navigation instructions. The process for selecting the access point and the platform will be further described below by reference to FIG. 9.

As shown, the process 300 initially identifies (at 305) a node connection graph for the station in some embodiments. This graph in some embodiments includes (1) several nodes that represent a plurality of locations within the station, and (2) several edges that connect the nodes and that represent the connecting area (e.g., walkways, staircases, etc.) between the locations associated with the nodes.

In some embodiments, each edge is either unidirectional or bi-directional, and has a time associated with each of its directions, where the time represents the time needed to travel the connecting area that links the two locations associated with the edge's two nodes. The navigation application uses the edge times in some embodiments to compute the time needed to travel along a path in a transit station, and in turn, uses this time to identify other aspects of the navigated route (such as the best access point to use, the time for reaching the platform, etc.).

In some embodiments, each station's node connection graph is generated manually by surveyors traversing through the station, recording the instruction signs, and recording the time it takes to travel between different locations in the station. While performing the curation, the surveyors in some embodiments also generate unidirectional instruction edges that connect adjacent pairs of nodes or non-adjacent pairs of nodes in the connection graph. Each instruction edge specifies a set of text instructions (and in some cases one or more graphical instruction objects) to describe how to traverse between the instruction edge's two associated nodes along the direction of the edge. These instructions edges are used to provide the in-station navigation instructions, as further described below.

Figure 4:
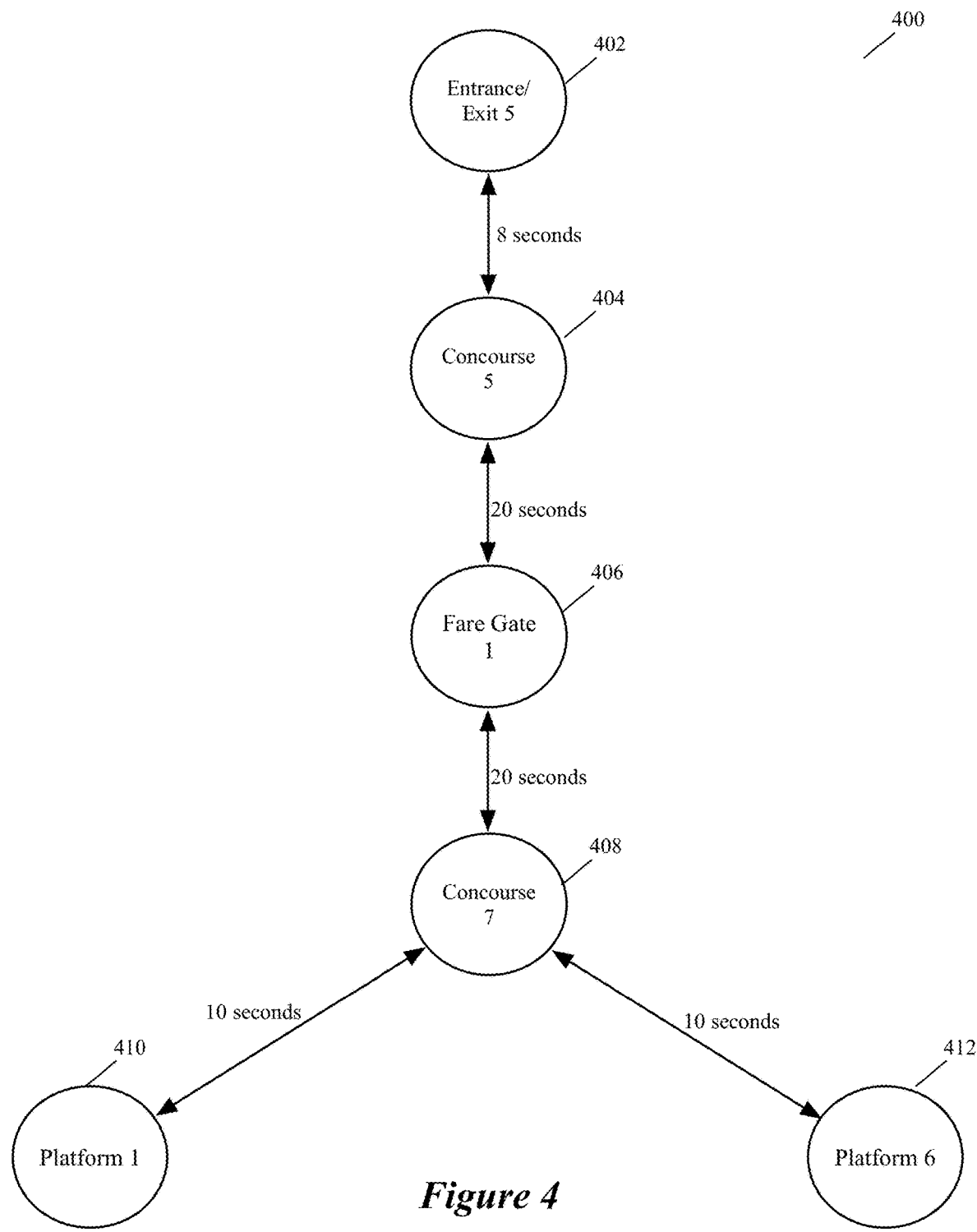
FIG. 4 illustrates an example of a portion of a node connection graph.

FIG. 4 illustrates an example of a portion of a node connection graph 400. As shown, the node connection graph 400 includes six nodes 402-412 that represent six locations within the station, which are access point 5, concourse 5, north fare gate, concourse 7, and platforms 1 and 6. This station has at least five access points, which serve as entrances and exits of the station.

The node graph 400 has five bi-directional edges that connect neighboring nodes in the graph. These edges represent connecting area (e.g., walkways, staircases, etc.) between the locations associated with the nodes. As shown, each edge has a time associated with it to represent the time needed to travel the connecting area that links the two locations associated with the edge's two nodes. The navigation application uses the edge times in some embodiments to compute the time needed to travel along a path in a transit station, as further described below by reference to FIG. 9.

Figure 5:
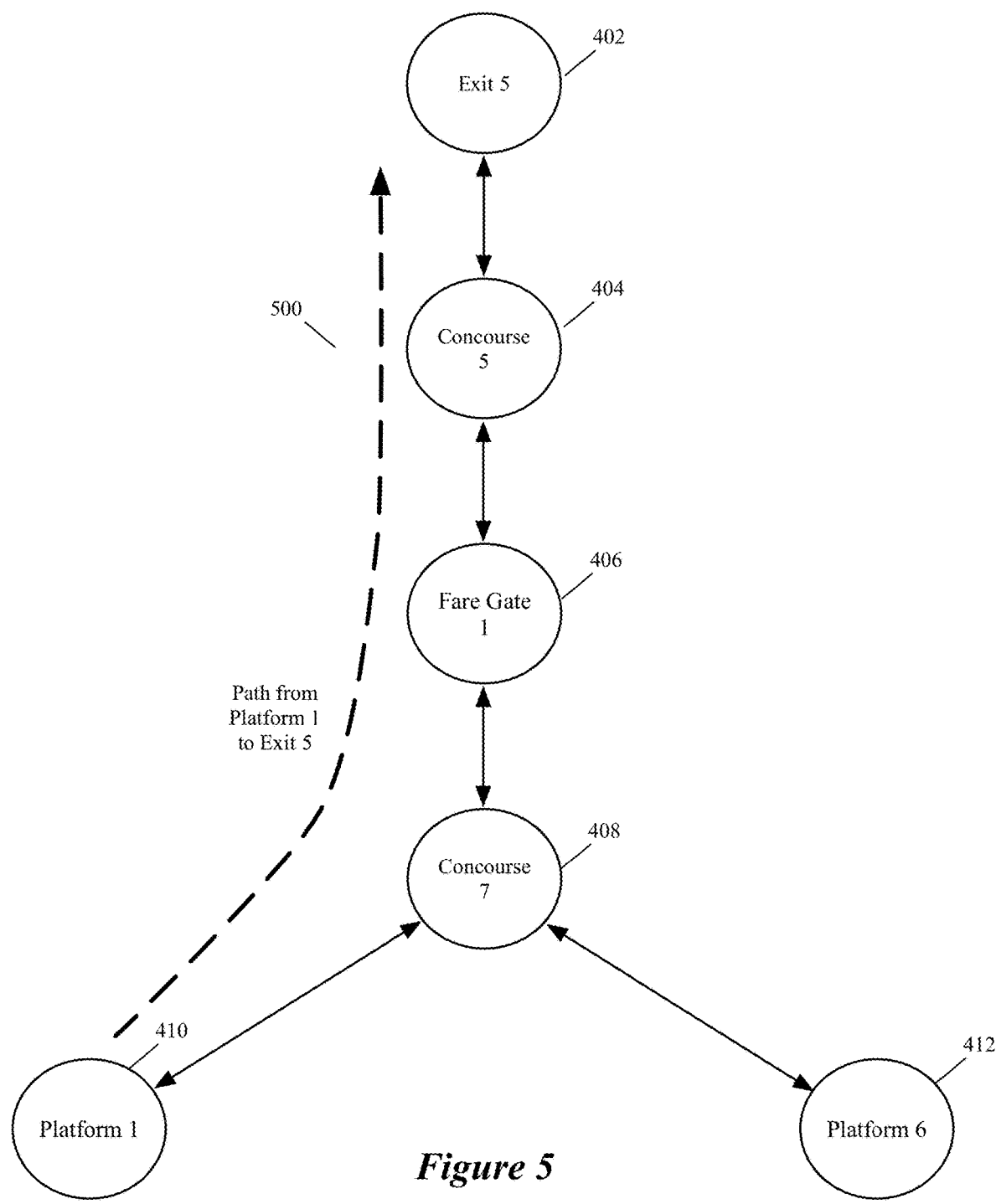
FIG. 5 illustrates an example of a path between a path and an exit of the example illustrated in FIG. 4.

After identifying (at 305) the node connection graph, the process identifies (at 310) a path on the node graph between the access point and the platform, and identifies (at 310) all nodes in the connection graph that are used by this path. This path uses a subset of nodes in the node graph, and has a direction. When the access point is a station entrance, the path is from the entrance to the platform at which a transit vehicle departs. When the access point is a station exit, the path is from the platform at which a transit vehicle arrives to the exit. For the example illustrated in FIG. 4, FIG. 5 illustrates an example of a path 500 from the Platform 1 to the Exit 5. To connect the nodes 402 and 410 that are associated with Exit 5 and Platform 1, the path 500 traverses through intervening nodes 404, 406 and 408 associated with concourse 5, north fare gate, and concourse 7.

Figure 6:
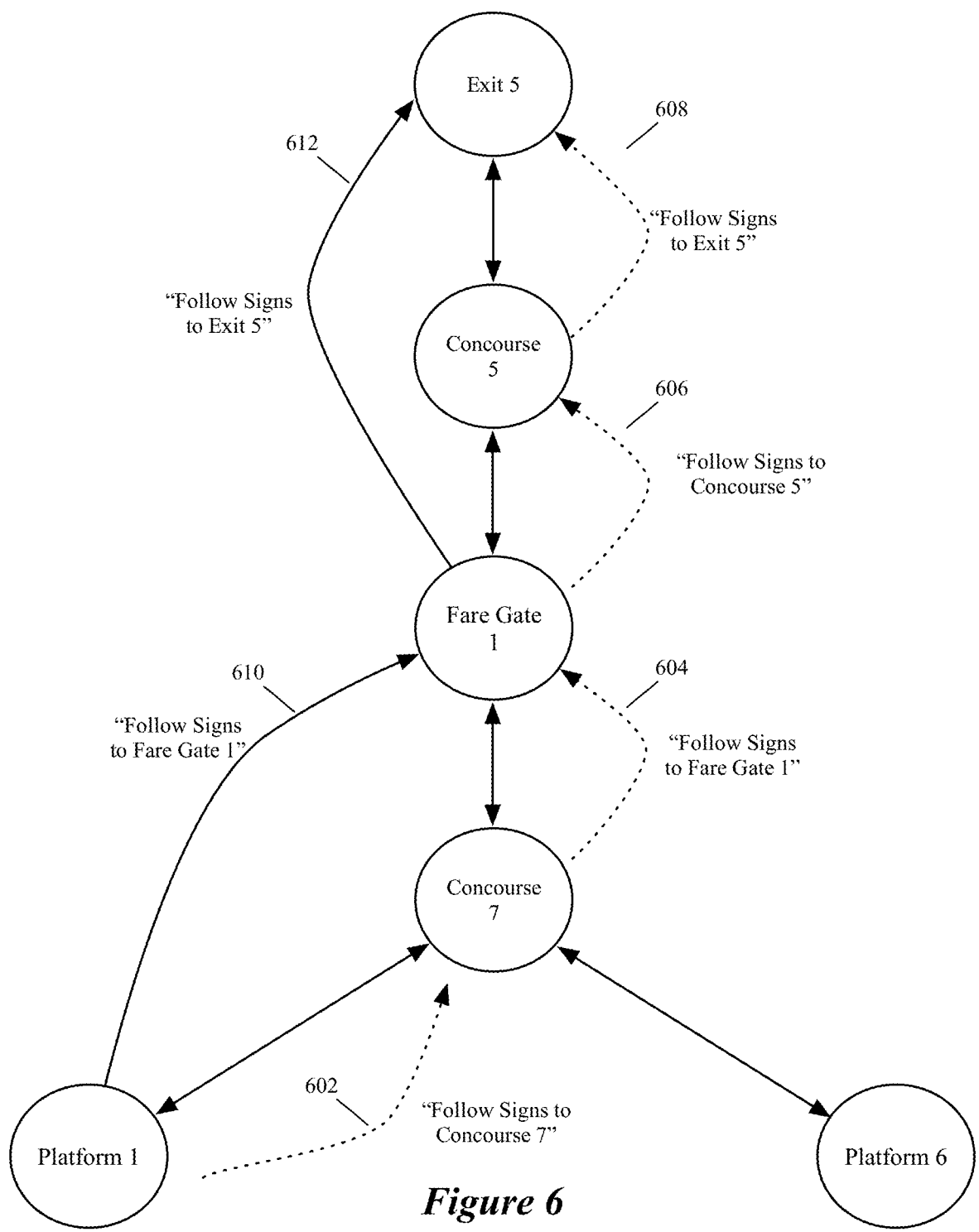
FIG. 6 illustrates six instruction edges that are defined between the pairs of nodes in the node set of FIG. 4.

After identifying the path, the process identifies (at 315) all navigation instruction edges that connect any two pairs of nodes in the node set used by the path identified at 310. For the example illustrated in FIGS. 4 and 5, FIG. 6 illustrates six instruction edges 602-612 that are defined between the pairs of nodes in the node set 402-410. Each instruction edge associates a pair of station locations that are represented by a pair of nodes in the identified set of nodes in the direction of the path. Each instruction edge in some embodiments contains instructions for traveling between two locations in the station. The instructions of each instruction edge are identified by text in quotes that is placed next to the instruction edge.

As described above, the pair of nodes associated with an instruction edge does not have to be neighboring nodes in the connection graph. Hence, some instructions edges can provide instructions for traveling between two adjacent locations that are represented by two neighboring (i.e., consecutive) nodes in the node graph, while other instructions edges can provide instructions for traveling between two non-adjacent locations that are represented by two non-neighboring nodes in the node graph. In the example illustrated in FIG. 6, four instruction edges 602-608 are defined between a pair of nodes that are adjacent in the node graph 400, while two instructions edges 610 and 612 are defined between a pair of nodes that are not adjacent in the node graph.

Next, to generate the navigation instructions, the process 300 selects (at 320) a subset of instructions edges that are the largest edges that when placed end to end, traverse the selected path. In the example illustrated in FIG. 6, this subset of instruction edges are edges 610 and 612. To select the subset of the largest edges, the process starts by selecting the starting node of the path in the connection graph. For the selected node, the process (1) identifies all instruction edges associated with the selected node that travel to another node along the identified path (i.e., the path identified at 310), and then (2) selects the largest identified instruction edge (i.e., the instruction edge that goes to the node in the path this is the farthest from the selected node).

The process then iteratively performs these operations for each node at the tail end of a selected instruction edge until the tail end reaches the node at the end of the path. Specifically, for each node at the tail end of an instruction edge that it previously selected for the previously selected node, the process (1) identifies all instruction edges associated with the selected node that travel to another node along the identified path, and then (2) selects the largest identified instruction edge. When the tail end of a selected instruction edge reaches the end of the path (i.e., reaches the exit access point when the path is from a platform to an exit, or reaches a platform when the path is from an entrance to the platform), the process has identified the subset of instruction edges to use for providing the in-station navigation instructions.

The process selects (at 320) the subset of the largest edges because in a station, the instruction signs can guide travel between two non-neighboring locations, and the process 600 mimics the station signs in order to avoid confusion and to provide fewer navigation instructions (i.e., by eliminating unnecessary navigation instructions to intervening neighboring station locations). Thus, in the example illustrated in FIG. 6, the instruction edges 602-608 are discarded (filtered out) at 320, because the instruction edges 610 and 612 provide the fewest number of edges that traverse the path 500.

Figure 7:
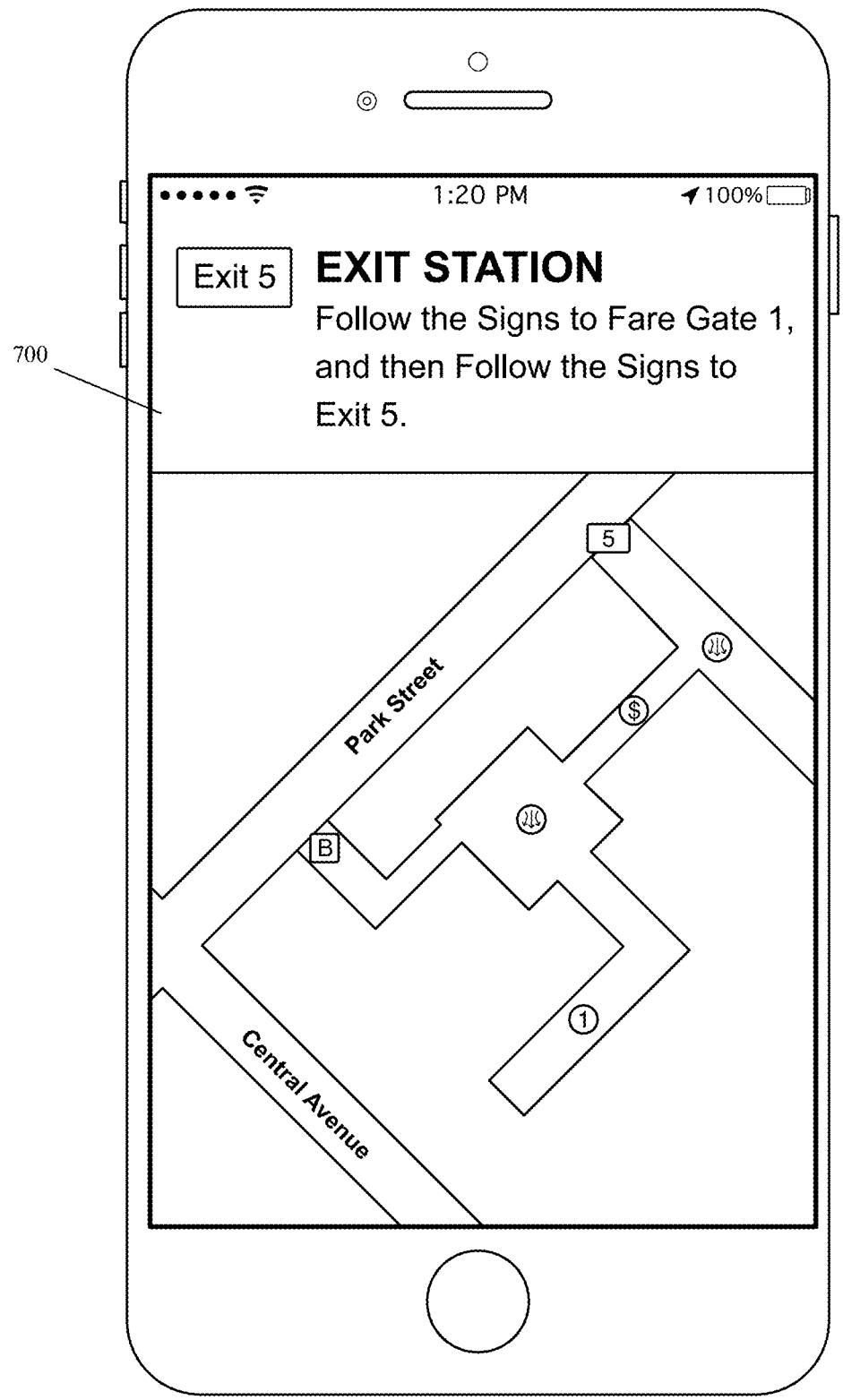
FIG. 7 illustrates an example of these navigation instructions being presented in a navigation banner.

Finally, at 325, the process 300 uses the selected subset of instruction edges to generate the in-station navigation instructions. FIG. 7 illustrates an example of these navigation instructions being presented in a navigation banner 700. As shown, this manner states: "Follow the Signs to Fare Gate 1, and then Follow the Signs to Exit 5." As shown in FIG. 6, the text instructions are associated with the selected subset of instruction edges 610 and 612. The banner 700 does not provide instructions to intervening concourse 5 and concourse 7 locations (i.e., does not use the text instructions of instructions edges 602-608) because the station signs near Platform 1 refer to Fare Gate 1, and the station signs at Fare Gate 1 refer to Exit 5. Providing instructions to the intervening locations would either confuse the user or provide unnecessary level of instructions to the user.

Figure 8:
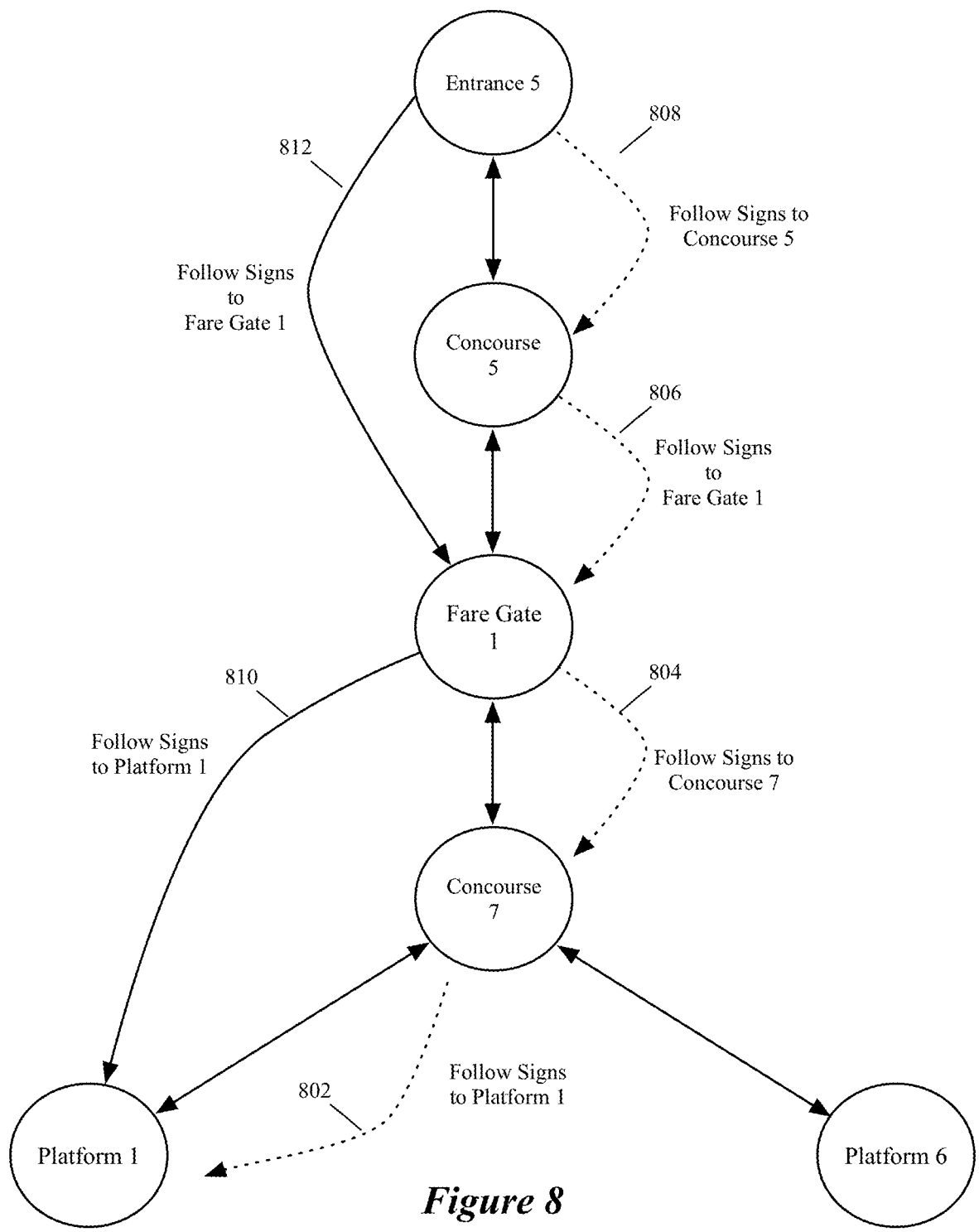
FIG. 8 illustrates the instruction edges for traveling from an entrance to a platform in a station.

As mentioned above, the instruction edges are unidirectional in some embodiments. FIG. 8 illustrates the instruction edges 802-812 for traveling from Entrance 5 to the Platform 1. These edges would be used when the navigation application needs to plan a route that uses a transit vehicle that departs from Platform 1, after the user is directed to use Entrance 5.

The navigation application of some embodiments generates turn-by-turn navigation instructions inside of a transit station as part of a navigation presentation that provides turn-by-turn navigation instructions from one location outside of the transit station to another location outside of the transit station. As such, the navigation application identifies the travel within the transit station as just one portion of the overall route that is being navigated. To find an optimal path through the transit station, the navigation application explore one or more internal paths inside the station with one or more external paths outside of the station in order to identify the best overall route (inside and outside of the station) in terms of one set of metrics.

Figure 9:
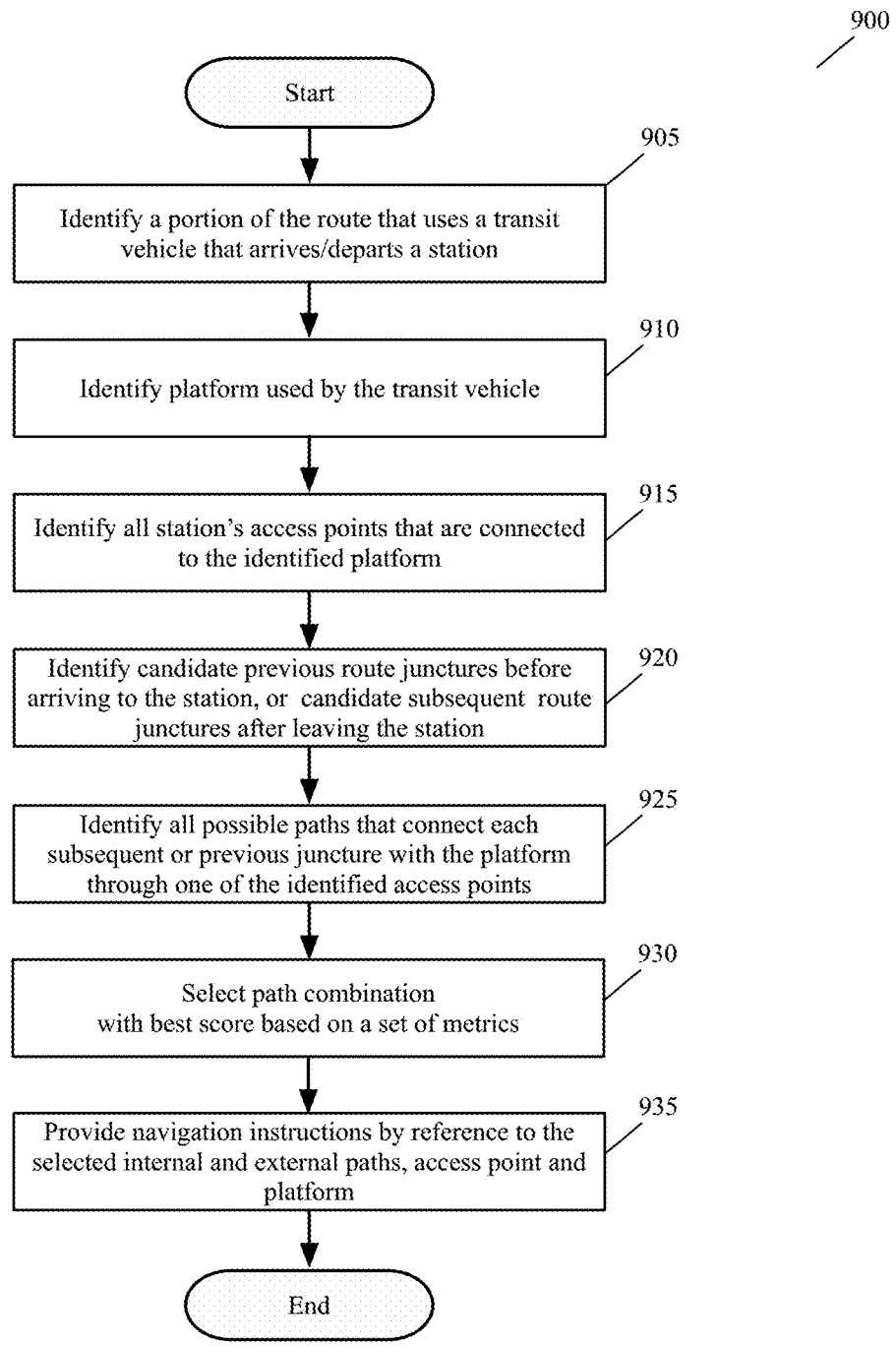
FIG. 9 illustrates a process that the navigation application of some embodiments performs to identify an optimal path through a transit station, by exploring different combinations of internal and external paths.

FIG. 9 illustrates a process 900 that the navigation application of some embodiments performs to identify an optimal path through a transit station, by exploring different combinations of internal and external paths. The navigation application performs this process after identifying a route, between two locations outside of the transit station, that uses a transit vehicle that travels to or from the transit station. As shown, the process 900 starts (at 905) when the navigation application identifies a portion of the route that uses a transit vehicle that arrives or departs from the transit station. The transit vehicle travels along a transit line that has a stop at the transit station.

At 910, the process 900 identifies a platform within the station at which the transit vehicle stops or departs. Next, at 915, the process identifies all access points that are connected to the platform identified at 910 through one or more walkways in the station. At 920, the process then identifies (1) one or more candidate previous junctures in the navigated route before arriving to the station, when the route uses a transit vehicle to leave the station, or (2) one or more candidate subsequent junctures in the navigated route after arriving at the station, when the route uses a transit vehicle to arrive at the station.

Next, at 925, the process identifies all possible combinations of (1) an internal path (inside the station) that connects one of the station's access points to the path identified at 915, with (2) an external path (outside the station) that connects the same access point (as used by the internal path in the combination) with a juncture identified at 920. At 925, the process computes a score for each combination of an internal path and an external path (e.g., by summing the score of the internal path with the score of the external path). In some embodiments, each path's score is computed based on its travel time, based on its distance, based on a weighted combination of its travel time score and its distance score, or based on a specific curated path provided by the surveyor. In some embodiments when a specific curated path is provided by the surveyor, the surveyor might provide a cost for an internal path that will heavily bias the selection heavily towards the internal path. Alternatively, in some embodiments when a specific curated path is provided by the surveyor, this curated path is selected as the internal path without computing a cost for this path.

After identifying and scoring all internal and external path combinations, the process then selects (at 930) the path combination that had the best score. The process then provides (at 935) in-station navigation instructions by reference to the instruction edges that the selected internal path (of the combination identified at 930) uses. To perform this operation 935, the process performs the process 300 that was described above by reference to FIG. 3. After 935, the process ends.

In the examples described above by reference to FIGS. 1-9, the navigation application provides in-station navigation instructions for navigating between a station access point (i.e., station entrance or exit) and a platform. The navigation application of some embodiments not only can provide navigation instructions for such ingress and egress paths, but also can provide navigation instructions for navigating from one platform to another platform in the station. For instance, for the example illustrated in FIGS. 4, 5, 6, and 8, the navigation application can provide instructions for navigating between platforms 1 and 6. The navigation instructions for traveling from platform 1 to platform 6 might specify use the "Follow Signs to Concourse 7" of the instruction edge 602, and then specify "Follow Sings to Platform 6" of an instruction edge that starts at Concourse 7's node and ends on the node of Platform 6. When the in-station signs near Platform 1 identify the route to Platform 6, a navigation instruction edge can be defined to go from Platform 1 to Platform 7, and the navigation application would use this instruction edge to provide navigation guidance.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
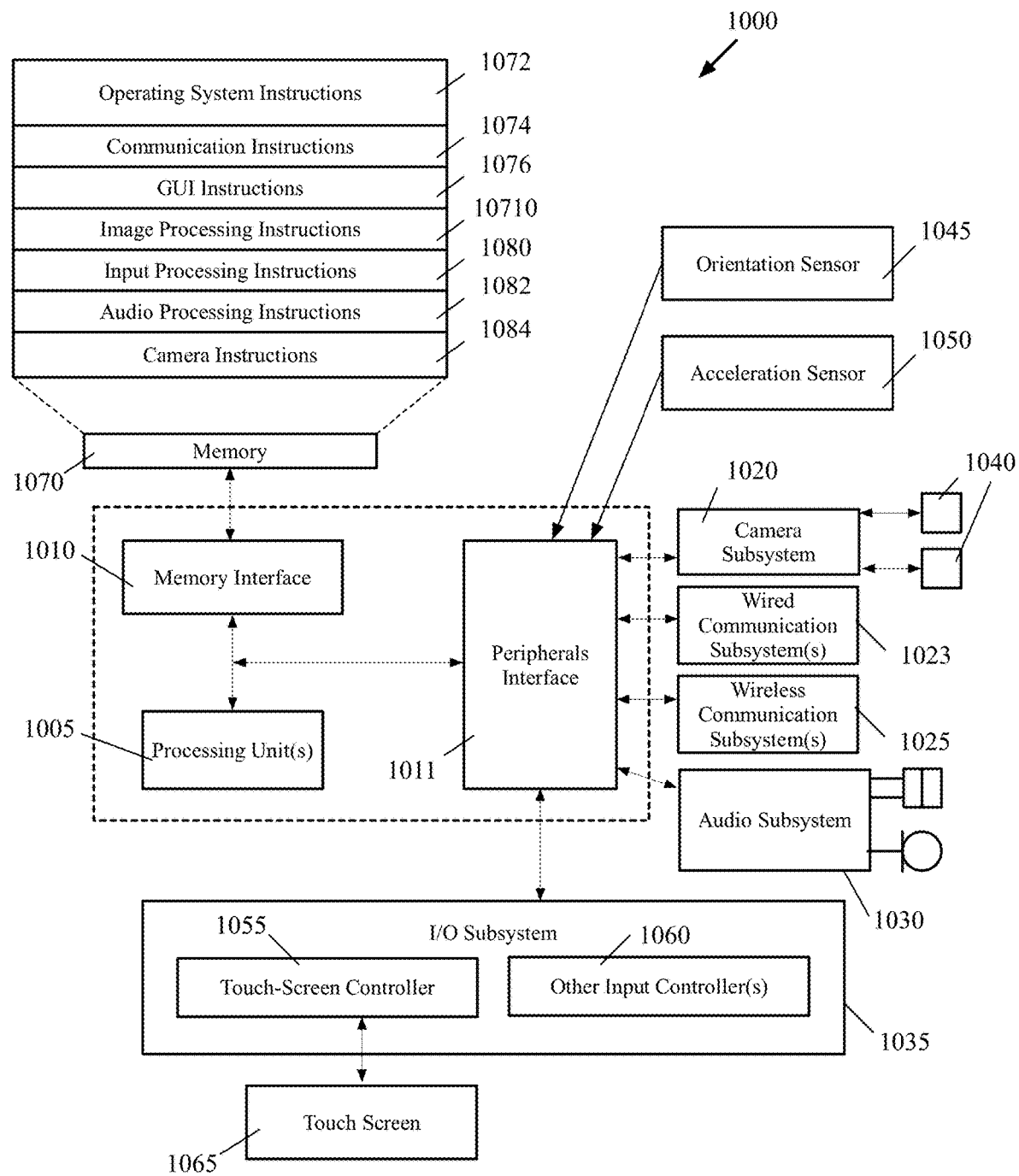
FIG. 10 is an example of an architecture of a mobile computing device with which some embodiments of the invention are implemented.

The applications of some embodiments operate on mobile devices, such as smart phones (e.g., iPhones®) and tablets (e.g., iPads®). FIG. 10 is an example of an architecture 1000 of such a mobile computing device. Examples of mobile computing devices include smartphones, tablets, laptops, etc. As shown, the mobile computing device 1000 includes one or more processing units 1005, a memory interface 1010 and a peripherals interface 1015.

The peripherals interface 1015 is coupled to various sensors and subsystems, including a camera subsystem 1020, a wireless communication subsystem(s) 1025, an audio subsystem 1030, an I/O subsystem 1035, etc. The peripherals interface 1015 enables communication between the processing units 1005 and various peripherals. For example, an orientation sensor 1045 (e.g., a gyroscope) and an acceleration sensor 1050 (e.g., an accelerometer) is coupled to the peripherals interface 1015 to facilitate orientation and acceleration functions.

The camera subsystem 1020 is coupled to one or more optical sensors 1040 (e.g., a charged coupled device (CCD)

optical sensor, a complementary metal-oxide-semiconductor (CMOS) optical sensor, etc.). The camera subsystem 1020 coupled with the optical sensors 1040 facilitates camera functions, such as image and/or video data capturing. The wireless communication subsystem 1025 serves to facilitate communication functions. In some embodiments, the wireless communication subsystem 1025 includes radio frequency receivers and transmitters, and optical receivers and transmitters (not shown in FIG. 10). These receivers and transmitters of some embodiments are implemented to operate over one or more communication networks such as a GSM network, a Wi-Fi network, a Bluetooth network, etc. The audio subsystem 1030 is coupled to a speaker to output audio (e.g., to output voice navigation instructions). Additionally, the audio subsystem 1030 is coupled to a microphone to facilitate voice-enabled functions, such as voice recognition (e.g., for searching), digital recording, etc.

The I/O subsystem 1035 involves the transfer between input/output peripheral devices, such as a display, a touch screen, etc., and the data bus of the processing units 1005 through the peripherals interface 1015. The I/O subsystem 1035 includes a touch-screen controller 1055 and other input controllers 1060 to facilitate the transfer between input/output peripheral devices and the data bus of the processing units 1005. As shown, the touch-screen controller 1055 is coupled to a touch screen 1065. The touch-screen controller 1055 detects contact and movement on the touch screen 1065 using any of multiple touch sensitivity technologies. The other input controllers 1060 are coupled to other input/control devices, such as one or more buttons. Some embodiments include a near-touch sensitive screen and a corresponding controller that can detect near-touch interactions instead of or in addition to touch interactions.

The memory interface 1010 is coupled to memory 1070. In some embodiments, the memory 1070 includes volatile memory (e.g., high-speed random access memory), non-volatile memory (e.g., flash memory), a combination of volatile and non-volatile memory, and/or any other type of memory. As illustrated in FIG. 10, the memory 1070 stores an operating system (OS) 1072. The OS 1072 includes instructions for handling basic system services and for performing hardware dependent tasks.

The memory 1070 also includes communication instructions 1074 to facilitate communicating with one or more additional devices; graphical user interface instructions 1076 to facilitate graphic user interface processing; image processing instructions 1078 to facilitate image-related processing and functions; input processing instructions 1080 to facilitate input-related (e.g., touch input) processes and functions; audio processing instructions 1082 to facilitate audio-related processes and functions; and camera instructions 1084 to facilitate camera-related processes and functions. The instructions described above are merely exemplary and the memory 1070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 10 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 10 may be split into two or more integrated circuits.

Figure 11:
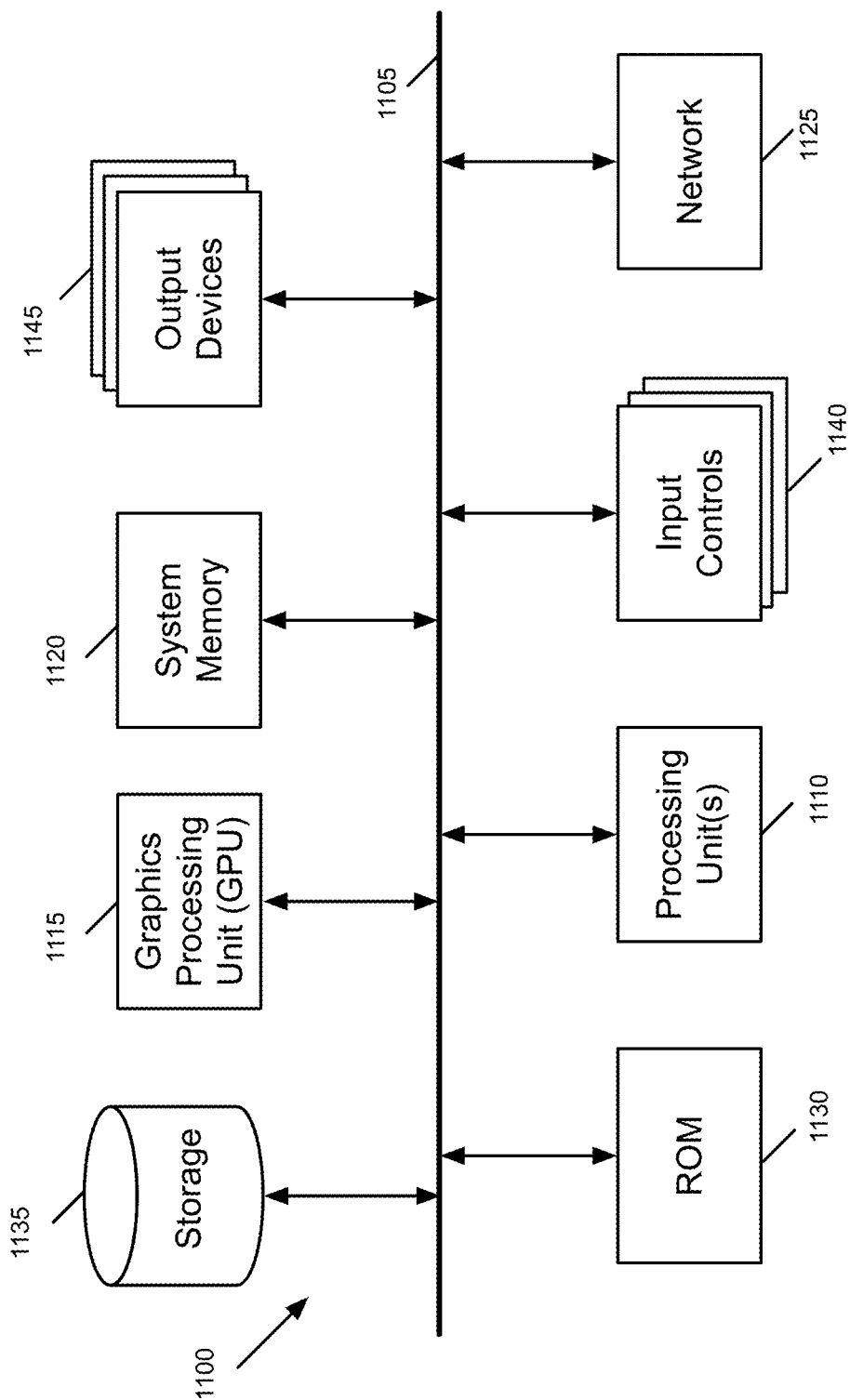
FIG. 11 conceptually illustrates another example of an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive, integrated flash memory) as the permanent storage device 1135.

Other embodiments use a removable storage device (such as a floppy disk, flash memory device, etc., and its corresponding drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet), or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 12:
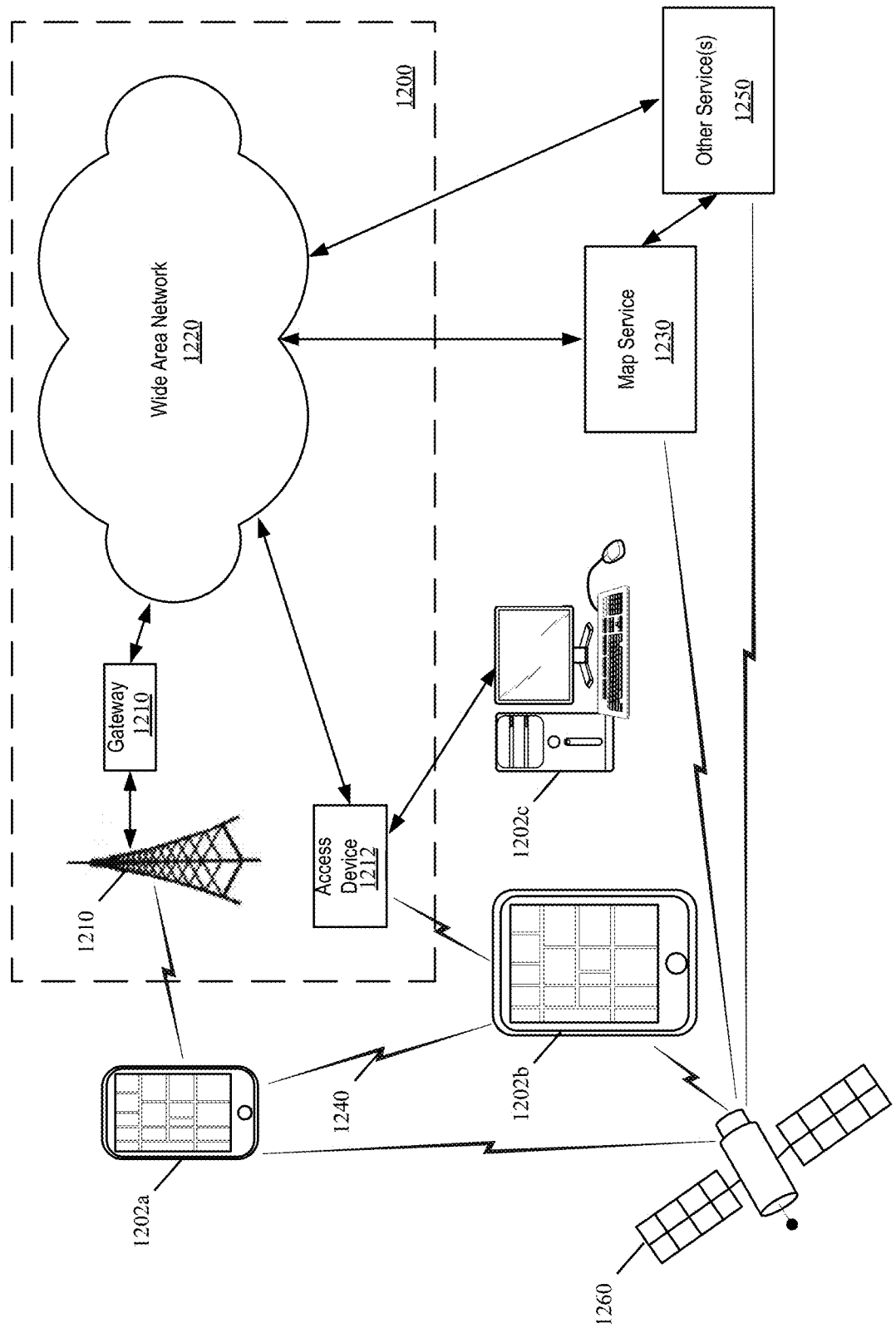
FIG. 12 illustrates one possible embodiment of an operating environment for a map service and client devices in some embodiments of the invention.

Various embodiments may operate within a map service operating environment. FIG. 12 illustrates one possible embodiment of an operating environment 1200 for a map service (also referred to as a mapping service) 1230 and client devices 1202a-1202c. In some embodiments, devices 1202a, 1202b, and 1202c communicate over one or more wired or wireless networks 1210. For example, wireless network 1210, such as a cellular network, can communicate with a wide area network (WAN) 1220, such as the Internet, by use of gateway 1214. A gateway 1214 in some embodiments provides a packet oriented mobile data service, such as General Packet Radio Service (GPRS), or other mobile data service allowing wireless networks to transmit data to other networks, such as wide area network 1220. Likewise, access device 1212 (e.g., IEEE 802.11g wireless access device) provides communication access to WAN 1220.

The client devices 1202a and 1202b can be any portable electronic or computing device capable of communicating with a map service (e.g., smart phone, tablet, laptop computer, etc.). Device 1202c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1202a-1202c are not shown as each accessing the map service 1230 via either the wireless network 1210 and gateway 1214 or the access device 1212, one of ordinary skill in the art will recognize that the client devices of some embodiments may access the map service via multiple different wired and/or wireless protocols.

Devices 1202a-1202c can also establish communications by other means. For example, these devices may communicate with other wireless devices (e.g., other devices 1202b, cell phones, etc.) over the wireless network 1210 or through access device 1212. Likewise the devices 1202a-1202c can establish peer-to-peer communications 1240 (e.g., a personal area network) by use of one or more communication subsystems, such as Bluetooth® communication or similar peer-to-peer protocols.

Devices 1202a-1202c may also receive Global Positioning Satellite (GPS) signals from GPS satellites 1260. In addition, in some embodiments the map service 1230 and other services 1250 may also receive GPS signals from GPS satellites 1260.

A map service 1230 may provide map services for one or more client devices 1202a-1202c in communication with the map service 1230 through various communication methods and protocols. A map service 1230 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1202a-1202c may utilize these map services to obtain the various map service data, then implement various techniques to process the data and provide the processed data to various entities (e.g., internal software or hardware modules, display screens of the client devices, external display screens, or other external systems or devices.

The map service 1230 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1202a-1202c, the map service 1230 of some embodiments, performs various optimization techniques to analyze a map tile before encoding the tile.

In some embodiments, the map tiles are generated by the map service 1230 for different possible display resolutions at the client devices 1202a-1202c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1230 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1230 responds to requests from the client devices 1202a-1202c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1202a-1202c that obtain map service data from the map service 1230 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1202a-1202c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1230. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1202a-1202c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1230 and/or other service(s) 1250 are configured to process search requests from any of the client devices. Search requests may include but are not limited to queries for businesses, addresses, residential locations, points of interest, or some combination thereof. Map service 1230 and/or other service(s) 1250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1230 and/or other service(s) 1250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1230 and/or other service(s) 1250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1230 and/or other service(s) 1250 provide one or more feedback mechanisms to receive feedback from client devices 1202a-1202c. For instance, client devices may provide feedback on search results to map service 1230 and/or other service(s) 1250 (e.g., feedback specifying ratings, reviews, temporary or permanent business closures, errors etc.); this feedback may be used to update information about points of interest in order to provide more accurate or more up-to-date search results in the future. In some embodiments, map service 1230 and/or other service(s) 1250 may provide testing information to the client device (e.g., an AB test) to determine which search results are best. For instance, at random intervals, the client device may receive and present two search results to a user and allow the user to indicate the best result. The client device may report the test results to map service 1230 and/or other service(s) 1250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures. However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

While the above-described techniques provide guidance for a path between an access point of the station and a platform, these techniques can be used to provide guidance between any two locations within a station. Also, one of ordinary skill will realize that the above-described techniques for providing navigation instructions within a transit station can easily be extended to providing navigation instructions within any large venue, such as a stadium, a mall, or other large private venue. To do this, some embodiments have the locations within a venue curated, define connection graphs with nodes for these curated locations and edges for the walkways connecting these nodes, and define instruction edges for the nodes to identify the in-venue signs for providing travel guidance between different locations within the venue. These graphs and edges can then be used by the map application of some embodiments to provide instructions for traveling within the venue. One of ordinary skill in the art would understand that the invention is not to be limited by the foregoing illustrative details, but rather is to be defined by the appended claims.

The invention claimed is:

1. A method of providing navigation instructions along a route within a station associated with a transit service, the method implemented using a mobile device comprising a processor, and a display screen, the method comprising:
   in response to a navigation instructions request, identifying a path from a first location to a second location within the station;
   identifying a first instruction sign of a plurality of instruction signs displayed within the station between the first and second locations, wherein the first instruction sign includes one or more of a plurality of instruction elements;
   selecting, from the plurality of instruction elements, a first instruction element that is related to the identified path;
   generating, by the mobile device, a second instruction element that is related to the identified path and is distinct from the first instruction sign;
   combining, based on the identified path, the first instruction element and the second instruction element;
   generating, by the processor, turn-by-turn navigation instructions for navigating the path based on the combination of the first instruction element and the second instruction element; and
   presenting, on the display screen, the turn-by-turn navigation instructions in association with a map presentation of the path.

2. The method of claim 1, wherein
   the first location is an entrance to the station and the second location is a platform at which a transit vehicle departs;
   the path is from the entrance to the platform; and
   the navigation instructions provide turn-by-turn guidance from the entrance to the platform.

3. The method of claim 1, wherein
   the second location is an exit of the station and the first location is a platform at which the transit vehicle stops to unload passengers;
   the path is from the platform to the exit; and
   the navigation instructions provide turn-by-turn guidance from the platform to the exit.

4. The method of claim 1, wherein at least one of the first and second locations is not an entry or an exit of the station nor a platform within the station.

5. The method of claim 1, wherein the navigation instructions are defined by reference to instructions provided on the signs displayed within the station,
wherein the first instruction element is one of a textual type of instruction element and a graphical type of instruction element, and
wherein the second instruction element is one of a textual type of instruction element and a graphical type of instruction element.

6. The method of claim 1, wherein each navigation instruction of the turn-by-turn navigation instructions comprises a set of text instructions, wherein the text instruction set for at least one navigation instruction is based on a first portion of text instructions of the first instruction sign that is relevant to a direction of the path but is not based on a second portion of the text instructions of the first instruction sign that is not relevant to the direction of the path.

7. The method of claim 1, wherein the first instruction sign contains a first set of text instructions that are represented by the first instruction element and a third instruction element, further comprising:
determining that a language setting of the mobile device corresponds to a first language;
determining that the first instruction element corresponds to the first language and that the third instruction element corresponds to a second language that is distinct from the first language; and
based on the determination that the first instruction element corresponds to the first language, selecting the first instruction element from the first instruction sign and declining to select the third instruction element for generating the turn-by-turn navigation instructions.

8. The method of claim 1,
wherein the first instruction sign comprises a graphical object,
wherein a particular navigation instruction, which is defined based on the first instruction sign, includes a representation of the graphical object.

9. The method of claim 8, wherein the graphical object is a directional arrow or an icon associated with a location within the station.

10. The method of claim 1, wherein each of a set of navigation instructions includes a set of words that are identical to at least a subset of words used in the first instruction sign associated with the navigation instruction.

11. The method of claim 1, further comprising providing one navigation banner comprising two or more turn-by-turn navigation instructions associated with two or more signs in the station.

12. The method of claim 1, further comprising providing a plurality of navigation banners each of which provides just one navigation maneuver associated with one instruction sign in the station.

13. The method of claim 1, wherein the navigation instructions refer to the signs displayed in the station.

14. A mobile device comprising a non-transitory medium for storing a navigation application for providing navigation instructions along a route within a station, the program comprising sets of instructions for:
in response to a navigation instructions request, identifying a path from a first location to a second location within the station;
identifying a first instruction sign of a plurality of instruction signs displayed within the station between the first and second locations, wherein the first instruction sign includes one or more of a plurality of instruction elements;
selecting, from the plurality of instruction elements, a first instruction element that is related to the identified path;
generating, by the mobile device, a second instruction element that is related to the identified path and is distinct from the first instruction sign;
combining, based on the identified path, the first instruction element and the second instruction element generated by the processor;
generating, by the processor, turn-by-turn navigation instructions for navigating the path based on the combination of the first instruction element and the second instruction element; and
presenting, on the display screen, the turn-by-turn navigation instructions in association with a map presentation of the path.

15. The mobile device of claim 14, wherein the program comprises sets of instructions for:
defining, for the station, a node graph comprising a plurality of nodes representing a plurality of locations in the station, wherein the node graph includes a plurality of instruction edges that each connect adjacent pairs of nodes of the plurality of nodes, wherein each instruction edge of the plurality of instruction edges specifies one or more instruction elements that describe how to traverse between two nodes that are associated with the instruction edge;
identifying a path on the node graph between first and second locations, said path comprising a set of nodes in the node graph; and
defining the turn-by-turn navigation instructions by reference to one or more edges of the node graph that each associate a pair of station locations represented by a pair of nodes in the set of nodes in a direction of the path.

16. The mobile device of claim 15, wherein at least one instruction sign which is used for one navigation instruction, provides instructions for traveling between two non-adjacent station locations represented by two non-contiguous nodes in the node graph.

17. The mobile device of claim 15, wherein the program comprises sets of instructions for:
retrieving instructions, from a storage structure, that are associated with the nodes in the set of nodes for the direction of the path, each retrieved instruction associated with an instruction sign in the station;
discarding each retrieved instruction that associates a closer pair of nodes that is within another farther pair of nodes that are associated by another retrieved instruction; and
defining the navigation instructions by the retrieved instructions that are not discarded.

18. The mobile device of claim 15, wherein the program comprises sets of instructions for providing a single navigation banner with two or more navigation instructions for two or more navigation maneuvers between two or more pairs of locations in the station.

19. The mobile device of claim 15, wherein the program comprises sets of instructions for providing a plurality of navigation banners, each banner providing a navigation instruction for navigating between a pair of locations in the station.

20. The mobile device of claim 14, wherein the plurality of instruction signs correspond to actual signs displayed at the station for providing instructions for traveling between different locations in the station.

21. The mobile device of claim 14, wherein the plurality of instruction signs is curated by manually traversing through the station and recording the instructions.

22. The mobile device of claim 14, wherein the plurality of instruction signs is received from a set of servers of the station operator or third party.

\* \* \* \* \*